United States Patent [19]
Kanouda et al.

[11] Patent Number: 5,642,269
[45] Date of Patent: Jun. 24, 1997

[54] POWER SUPPLY APPARATUS HAVING SEPARATE PLURAL OUTPUTS

[75] Inventors: Akihiko Kanouda, Katsuta; Tadashi Takahashi, Hitachi; Kazuhiro Takizawa; Tetsuya Obara, both of Yokohama; Makoto Kawamura, Esashi; Masami Joraku, Tokai-mura; Yoshio Miyamoto, Hitachi, all of Japan

[73] Assignees: Hitachi, Ltd.; Hitachi Mizusawa Electronics Co., Ltd., both of Japan

[21] Appl. No.: 338,197

[22] Filed: Nov. 9, 1994

[30] Foreign Application Priority Data

Nov. 9, 1993 [JP] Japan ................. 5-279279

[51] Int. Cl.⁶ .................................................. H02M 3/335
[52] U.S. Cl. .................................................. 363/20; 363/70
[58] Field of Search ............................... 363/15, 16, 20, 363/21, 44, 45, 47, 48, 67, 69, 70

[56] References Cited

U.S. PATENT DOCUMENTS

| | | | |
|---|---|---|---|
| 4,631,654 | 12/1986 | Hovee et al. | 363/21 |
| 4,660,136 | 4/1987 | Montorefano | 363/26 |
| 4,672,516 | 6/1987 | Ney et al. | 363/16 |
| 4,685,020 | 8/1987 | Driscoll et al. | 363/70 |
| 4,833,582 | 5/1989 | Kupka | 363/70 |
| 4,847,742 | 7/1989 | Ohashi et al. | 363/70 |
| 4,912,617 | 3/1990 | Hartmann et al. | 363/21 |
| 5,353,001 | 10/1994 | Meinel et al. | 336/83 |
| 5,400,239 | 3/1995 | Caine | 363/67 |
| 5,502,430 | 3/1996 | Takahashi et al. | 336/232 |

*Primary Examiner*—Jeffrey L. Sterrett
*Attorney, Agent, or Firm*—Evenson, McKeown, Edwards & Lenahan P.L.L.C.

[57] ABSTRACT

A circuit construction comprising a diode and a capacitor is connected to a secondary coil of a thin transformer such as a wire-type transformer. An excitation energy is discharged during a reset time of the transformer, and this excitation energy is accumulated in the capacitor, thereby output voltage is obtained through the capacitor. A direct current output voltages having two outputs is obtained through one transformer. A small volume and a light weight of the transformer, so that a compact and thin power supply apparatus can be obtained. Since a winding ratio of the transformer can be made small, a copper loss of the transformer can be reduced. It is unnecessary to select a higher switching frequency and a manufacturing cost of the power supply apparatus can be reduced.

9 Claims, 3 Drawing Sheets

POWER SUPPLY APPARATUS HAVING SEPARATE PLURAL OUTPUTS

BACKGROUND AND SUMMARY OF THE INVENTION

The present invention relates to a power supply apparatus; and more particularly, to a compact power supply apparatus in which a transformer and other components are small and sufficiently thin to be suitable for use as a power supply for a portable information machine, such as a notebook type word processor or a personal computer.

In a conventional multi-output power supply of the type used in a hand held compact information machine a switching regulator such as shown, for example, in Japanese utility model laid-open No. 64988/1992, is widely used. In this switching regulator, a direct current input is applied to a primary coil of a transformer and a switching element, which are connected in series. (The transformer has a multi-coil form and plural secondary coils at a secondary side.) The switching element switches "on" and "off", so that at the plural secondary coils of the transformer an alternating current having the same frequency as the frequency of the switching element can be obtained. The alternating current is then rectified and supplied to a load.

As a control of an output voltage in the above-stated conventional machine, it has been generally known that, the pulse width of the switching element at the primary side of the transformer is varied in response to increases and decreases of the main load voltage.

In hand held information machines, it is important for the machine to have a compact size and a thin power supply. However, one difficulty posed by such power supplies is the compact size of the transformer used in the power supply portion.

By using a transformer having no iron core, such as wire type transformer having a parallel arrangement of a primary coil and a secondary coil which are insulated from each other, contacted and wound spirally, or by using a thin transformer in which a thin iron core is added to the above-stated wire-type transformer arrangement, it is possible to provide an extremely thin transformer, with a thickness of about 2–5 mm.

However, since it is intended to obtain plural outputs from the above-stated thin transformer, it is necessary to have plural insulated secondary coils, which presents a problem for obtaining a thinner construction of the transformer.

An object of the present invention is to provide a compact, thin power supply apparatus without use of plural transformers, and without complicated circuit construction.

To attain the above-stated object, the power supply apparatus according to the present invention comprises a transformer having a primary coil and a secondary coil, at least one switching element connected in series to the primary coil of the transformer, a first rectifying and smoothing circuit connected to the secondary coil of the transformer, and a secondary rectifying and smoothing circuit connected to the secondary coil of the transformer.

A first output is obtained from the first smoothing circuit and a secondary output is obtained from a capacitor of the second smoothing circuit. The present invention permits the circuit to be operated at a 70% maximum duty rate of the switching element. As used herein, the term "duty" rate refers to that portion of a single cycle during which the switch is in an "on", or conducting state.

According to the present invention, a supply voltage is applied to the primary coil of the transformer, and one or more output voltages are output through the secondary coil of the transformer. The value of the one or more output voltages differs from that of the supply voltage.

The transformer is comprised of overlapping substantially planar coils which are wound spirally, with separate conductors, each conductor having substantially the same length. One or more coils are formed as the primary coil of the transformer, and one or more coils are formed as the secondary coil. In a preferred embodiment, at least one part of the plural coils constituting the transformer is covered by an iron core made from a ferromagnetic body.

At an "on" time of the switching element, a first output is obtained from a current flowing in the first rectifying and smoothing circuit, and at an "off" time of the switching element, a second output is obtained from a current flowing in the second rectifying and smoothing circuit.

The D.C. voltage input from the direct current power supply is applied to the primary coil of the transformer during the "on" state of the switching element. During this time, the current is supplied to the smoothing circuit via the first diode connected to the secondary coil of the transformer and the direct current electric power is supplied to the first load.

When the above-stated switching element is switched to the "off" state, the reset current which constitutes the excitation energy of the transformer is supplied to a closed circuit which includes a second diode and a capacitor, which are also connected to the secondary coil of the transformer. During this time, a direct current voltage is generated in response to the electrical charge flowing into the capacitor. This D.C. voltage is smoothed by the output voltage stabilizing circuit and D.C. electric power is provided to the second load.

By means of the above-stated circuit construction, at the reset time of the transformer, the voltage accumulated in the above-mentioned capacitor is applied to the secondary side of the transformer, thus inducing a voltage at the primary side, which may actually be greater than the input voltage.

In conventional forward type convertors, the reset time of the transformer requires at least 50% in each cycle. However, according to the present invention, the reset time of the transformer is shortened to less than 30%, and it is thus possible to increase the "on" cycle of the switching element to a more than 70% duty rate. As a result, the winding ratio between the primary side and the secondary side of the transformer can be made smaller than that of the conventional machine, and the transformer volume can be reduced. In addition, the copper loss in the coil itself be reduced.

According to the present invention, by utilizing the excitation energy accumulated in the transformer such as the wire-type transformer, in addition to the output voltage conventionally obtained from the secondary side of the transformer, the output voltage can also be obtained through a simple second circuit arrangement connected to the secondary side of the transformer.

Other objects, advantages and novel features of the present invention will become apparent from the following detailed description of the invention when considered in conjunction with the accompanying drawings.

DETAILED DESCRIPTION OF THE DRAWINGS

Figure 1:
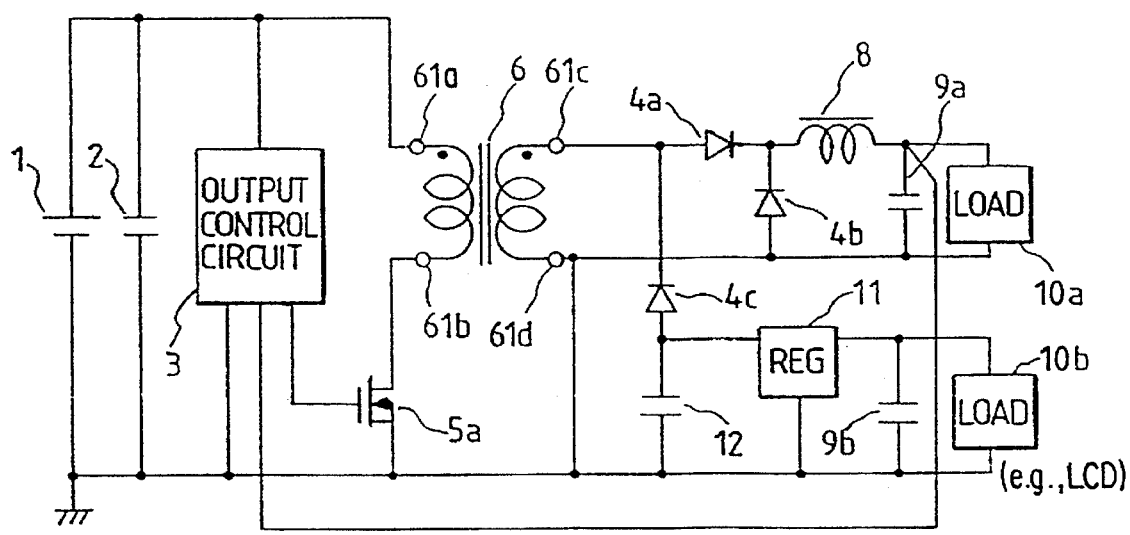
FIG. 1 is a schematic circuit diagram showing a first embodiment of a power supply apparatus using a two-output DC-DC convertor according to the present invention.

FIG. 1 is a schematic circuit diagram showing a first embodiment of a power supply apparatus according to the present invention, comprising a two-output DC-DC convertor.

It includes an external direct current power supply 1, an input smoothing capacitor 2, an output control circuit 3, rectifying diodes 4a, 4b and 4c, an N-channel MOSFET (metal oxide semiconductor field effect transistor) 5a, a transformer 6 with primary terminals 61a and 61b and second secondary terminals 61c and 61d, an output smoothing choke coil 8, output smoothing capacitors 9a and 9b, outside loads 10a and 10b (connected to an external system), an output voltage stabilizing circuit 11 (for example, a three-terminal regulator) and a capacitor 12.

The input smoothing capacitor 2 and the output control circuit 3 are connected respectively across the terminals of the external direct current power supply 1.

The positive terminal of the external direct current power supply 1 is connected to the primary terminal 61a of the primary coil of the transformer 6, while its negative terminal is connected to the source electrode of the N-channel MOSFET 5a. The drain electrode of the N-channel MOSFET 5a is connected to the primary terminal 61b of the primary coil of the transformer 6. The output control circuit 3 is connected to the terminals of the smoothing capacitor 2. The winding ratio between the primary coil and the secondary coil of the transformer 6 shown in the embodiment of FIG. 1 is 1:2.

The anode of diode 4a is connected to the secondary terminal 61c of the transformer 6, while it is connected to a cathode of the rectifying diode 4b. The anode of diode 4b is connected to the secondary terminal 61d of the secondary side of the transformer 6, whereby, a closed circuit construction is formed by the above-stated various circuit components.

Further, the output smoothing choke coil 8 and the output smoothing capacitor 9a are connected in series across the terminals of the rectifying diode 4b. The outside load 10a is connected to the terminals of the output smoothing capacitor 9a.

The cathode of diode 4c is connected to the secondary terminal 61c of the transformer 6, and its anode is connected to a terminal of the capacitor 12. The other terminal of the capacitor 12 is connected to the secondary terminal 61d of a transformer 6 and to the negative pole of the external direct current power supply 1.

The output voltage stabilizing circuit 11 is connected across the terminals of the capacitor 12, and the output smoothing capacitor 9b is connected between the output voltage stabilizing circuit 11 and the negative pole of the external direct current power supply 1. The outside load 10b is connected to the terminals of the output smoothing capacitor 9b, and the positive pole side of the output smoothing capacitor 9a is connected to the output control circuit 3.

Figure 2:
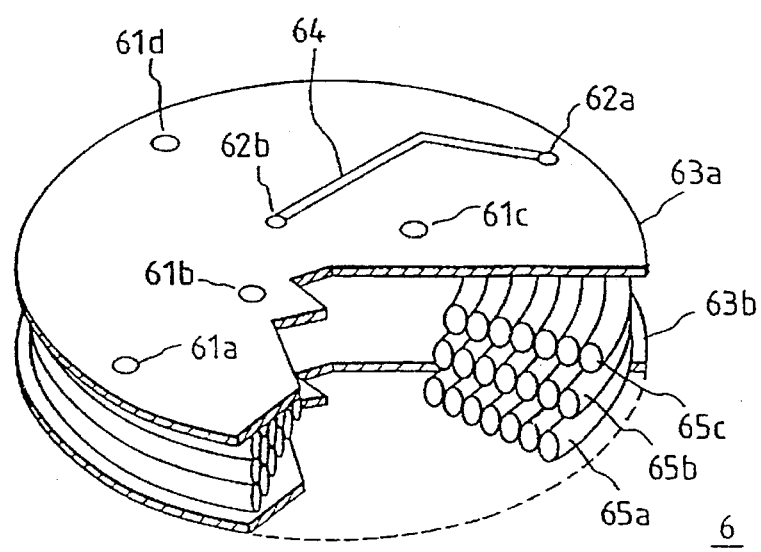
FIG. 2 is a partially broken away perspective view of a thin transformer having a wire-type construction used in the first embodiment of a power supply apparatus shown in FIG. 1.
Figure 3:
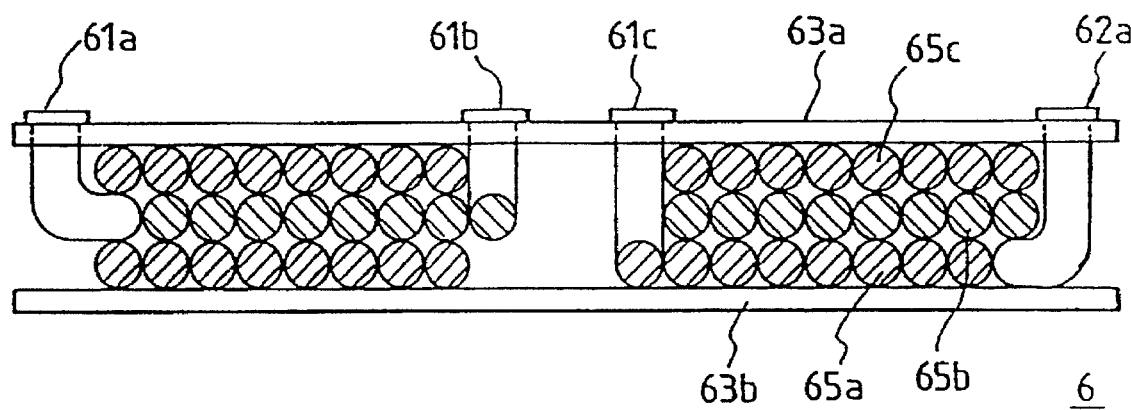
FIG. 3 is a cross-sectional view of the thin transformer shown in FIG. 2.

FIG. 2 shows an example of a wire-type transformer which is suitable for use as the transformer 6 in the embodiment of FIG. 1. FIG. 3 is a cross-sectional of the wire-type transformer as shown in FIG. 2.

In FIG. 2 and FIG. 3, the transformer 6 comprises primary terminals 61a and 61b and secondary terminals 61c and 61d, which correspond to those of FIG. 1, as well as further internal connecting terminals 62a and 62b of the secondary coil. Magnetic sheets 63a and 63b include a ferrite powder material in an interior portion thereof, and sheet 63a has a connecting wire 64 on an outer surface thereof.

A primary coil 65b is wound spirally in a plane, and is connected to the primary terminals 61a and 61b of the transformer 6. A first secondary coil 65a, connected between the secondary terminal 61c and a contact terminal 62a, is wound spirally in a plane, in parallel contact with the primary coil 65b while a second secondary coil 65c, connected between the secondary terminal 61d and the contact terminal 62b, is wound spirally in a plane, in parallel contact with the primarily child 65b, on the side opposite the first secondary coil 65a. Thus, the primary coil 65b is sandwiched between the secondary coils 65a, 65c.

The transformer 6 is thus constituted by overlapping coils formed by spirally winding plural insulating conductors, each of which has substantially the same length. Within these plural coils, one or more coils constitute the primary coil, while the remaining one or more coils constitute the secondary coil. Each of these coils 65a, 65b and 65c has an electrically insulating coating on its surface, which prevents a short circuit between the respective coils at their contact points.

The transformer 6 is sandwiched between top and bottom magnetic sheets 63a and 63b, which have the effect of increasing excitation inductance as well as reducing the loss generated by the transformer 6. In this embodiment according to the present invention, the excitation inductance of the primary side of the transformer 6 is about 5 μH.

Figure 4:
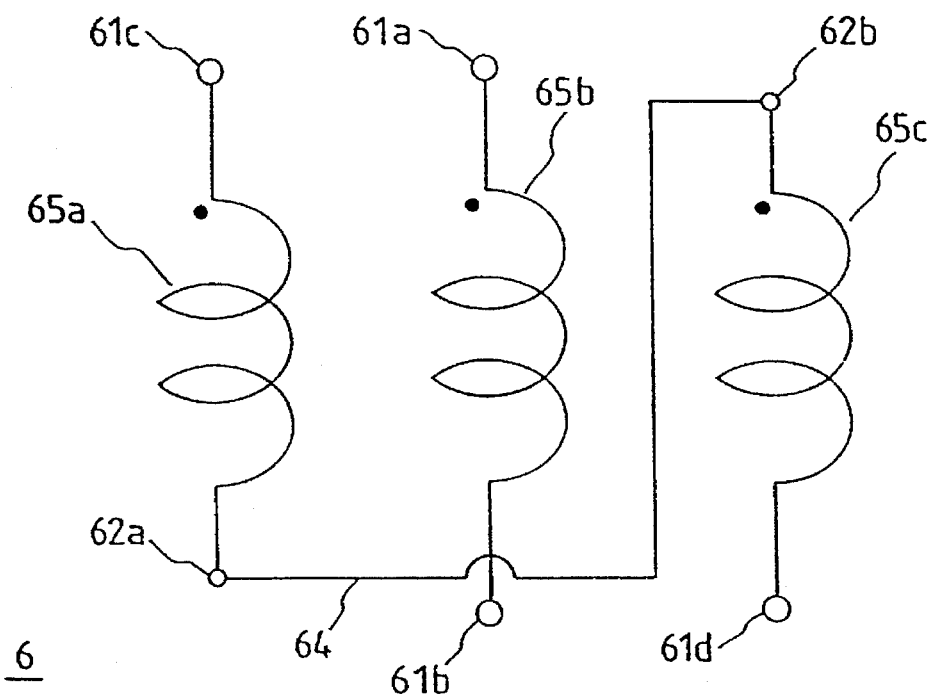
FIG. 4 shows a connection state of a wire-type transformer used in the first embodiment of a power supply apparatus shown in FIG. 1.

FIG. 4 shows the connection of the coils of the transformer 6 as described above. The first and the second secondary coils 65a and 65c are connected in series by the connecting wire 64 at the connecting terminals 62a and 62b. As a result, the transformer 6 has a winding ratio of 1:2 as between the primary terminals 61a and 61b and the secondary terminals 61c and 61d.

Figure 5:
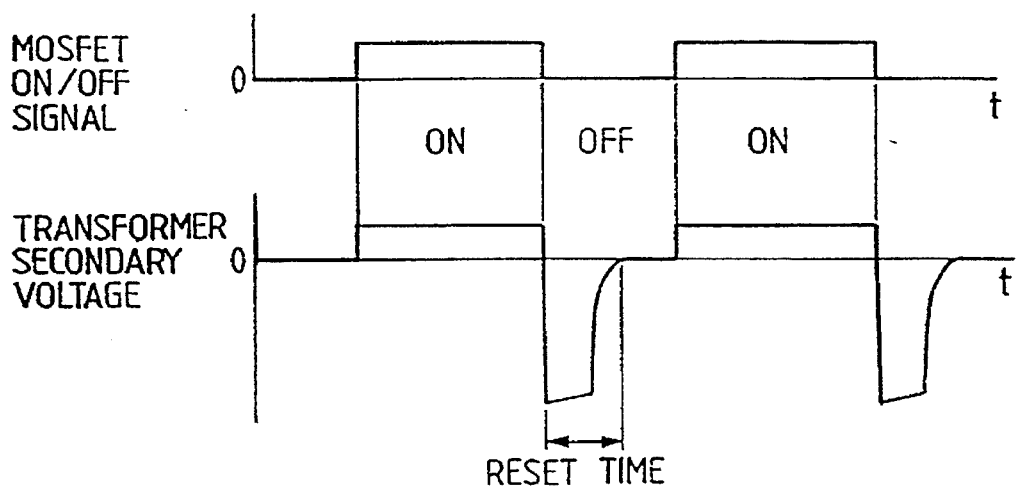
FIG. 5 is a time-chart showing an "on/off" signal of an N-channel MOSFET 5a and a voltage waveform of a secondary coil of a thin transformer of a power supply apparatus.

FIG. 5 is a time-chart of a signal waveform to explain the operation of the embodiment of FIG. 1. In this figure, the upper waveform represents an "on/off" signal of the N-channel MOSFET 5a, and the lower waveform represents the voltage between the secondary terminals 61c and 61d of the transformer 6.

The operation of this embodiment according to the present invention will be explained, with reference to FIGS. 1 to 5.

The voltage input from the external direct current power supply 1 (which may be, for example, a battery or an AC-DC convertor) is smoothed by the input smoothing capacitor 2 and is applied to the output control circuit 3. This input voltage may, for example, have a magnitude of from 4 to 12 volts DC.

The output control circuit 3 comprises a pulse width modulator (PWM) circuit, which is connected to the gate terminal of the N-channel MOSFET 5a. By increasing the potential of the gate terminal to the potential of the positive pole of the input smoothing capacitor 2 (see below), it can drive the N-channel MOSFET 5a to the "on" state, so that the voltage of the input smoothing capacitor 2 is applied to the primary coil of the transformer 6.

Because the winding ratio between the primary coil and the secondary coil of the transformer 6 is 1:2, a voltage of about two times the voltage of the input smoothing capacitor 2 is induced across the secondary coil of the transformer 6, and is applied to the series circuit comprising the rectifying diodes 4a and 4b. Diode 4a is thus switched to the "on" state, so that a current flows through diode 4a, the output smoothing choke coil 8 and the output smoothing capacitor 9a, which are connected in series across the secondary terminals 61c and 61d. The voltage across the output smoothing capacitor 9a is supplied to the outside load 10a as a first output.

The output control circuit 3 operates to switch the N-channel MOSFET 5a between "on" and "off" states with a predetermined frequency.

The coupling efficiency between the primary coil and the secondary coil of the transformer 6 increases abruptly when the frequency of the applied intermittent direct current is greater than several 10 kHz, since at such high frequency, current flows around an outer periphery of the coil conductor by the skin effect. The primary coil and the secondary coil of the transformer 6 contact, so that due to the physical proximity of the respective currents of the primary coil and the secondary coil, the coupling coefficients of the two coils are substantially improved. That is, because the primary current in the primary coil and the secondary current induced in the secondary coil are distributed at the surface of the coil cross section according to the surface effect, the two currents approach each other. Accordingly, it is preferable to set the frequency of the switching signal (pulse) of the N-channel MOSFET 5a more than 100 kHz. The frequency utilized in the embodiment of FIG. 1, for example, is about 300 kHz.

When the N-channel MOSFET 5a is driven to the "off" condition, the excitation energy of the secondary coil of the transformer 6 is discharged through the series connection of the capacitor 12 and the diode 4c. Accordingly, the capacitor 12 is charged in a direction such that the grounded end thereof becomes the positive pole.

This voltage is stabilized by the output voltage stabilizing circuit (the three-terminal regulator) 11 and applied to the output smoothing capacitor 9b and the outside load 10b. The output voltage stabilizing circuit 11 may be a commercially available three terminal voltage regulator such as, for example, the model HA179L00 three terminal negative fixed voltage regulator, available from Hitachi, Ltd., or an equivalent thereof.

At this point, the excitation energy discharged from the transformer 6 is proportional to the product of the excitation inductance, the square of the excitation current and the switching frequency of the transformer 6. However, when the excitation inductance increases, the excitation current decreases in inverse proportion to the excitation inductance, so that the excitation energy is inversely proportional to the excitation inductance. Therefore, it is possible to adjust the voltage generated at the output smoothing capacitor 9b through the excitation inductance and the switching frequency of the transformer 6.

During the "off" condition of the N-channel MOSFEt 5a, the energy accumulated in the output smoothing choke coil 8 circulates through the rectifying diode 4b.

For the purpose of controlling the output control of this circuit, the voltage of the output smoothing capacitor 9a is input to the output control circuit 3, where it is compared with a standard sawtooth voltage provided therein, and converted to a PWM signal to drive the MOSFET 5a, which controls the flow of current in the primary coil 61. The output control circuit 3 may be a commercially available PWM control IC, such as, for example, model HA16666P/FP, available from Hitachi, Ltd. The output of this circuit is also regulated by varying the duty rate of the "on" cycle and the "off" cycle of the N-channel MOSFET 5a.

In general, in forward type converters it is necessary to use a separately mounted reset coil; and furthermore, to secure a sufficient reset time, it is necessary to set the "on" cycle of the MOSFET at less than 50%.

However, as shown in FIG. 5, in the present invention having the above-stated circuit construction, during the reset time of the transformer 6, the voltage generated in the capacitor 12 is applied to the secondary coil of the transformer 6. In this manner, the absolute value of the voltage generated in the primary side of the transformer 6 during the "off" cycle of the N-channel MOSFET 5a can actually become larger than the voltage applied to the primary side during the "on" cycle of the N-channel MOSFET 5a.

Thus, in this embodiment according to the present invention, it is possible to shorten the rest time of the terminals of the capacitor 12 to about 30% of one cycle. Accordingly, it is possible to permit the "on" cycle of the N-channel MOSFET 5a to about 70%, exceeding 50%, of each cycle.

In the conventional circuit construction it is necessary to have a winding ratio of about 1:3 between the primary coil and the secondary coil. However, in the embodiment according to the present invention, it is possible to lower the winding ratio to 1:2, and the copper loss generated in the secondary coil can thus be reduced.

The voltage at the output smoothing capacitor 9b has a polarity such that the grounded terminal thereof is the positive or plus pole. As a result, it is preferable to use of the −22 V power supply for driving the liquid crystal display apparatus used, for example, in the hand held information machine.

Figure 6A:
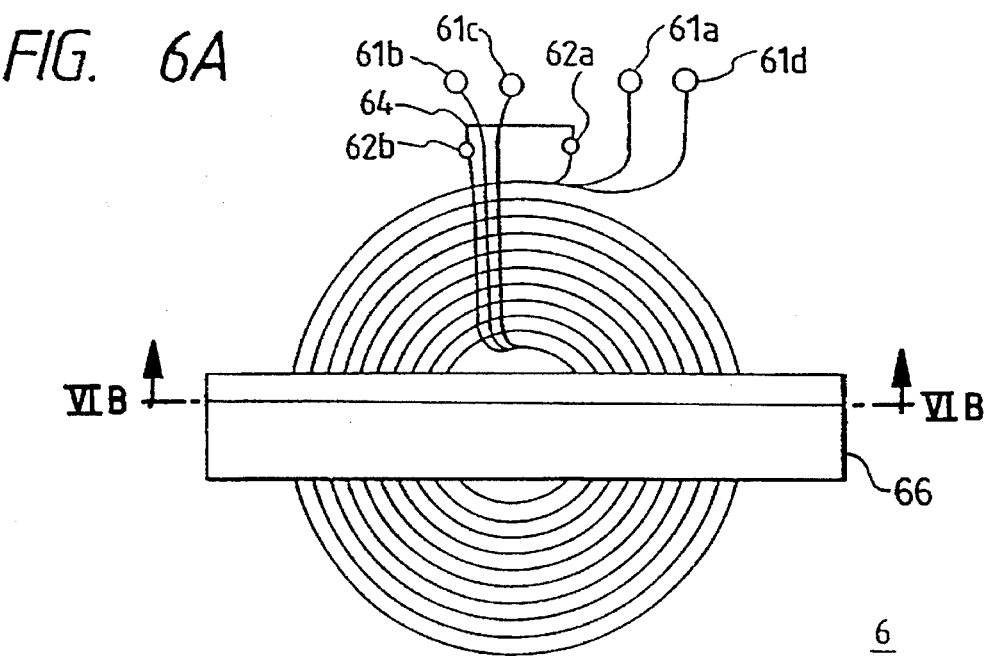
FIG. 6A is a plan view showing one example of a thin transformer having an iron core used in a second embodiment of a power supply apparatus according to the present invention.
Figure 6B:
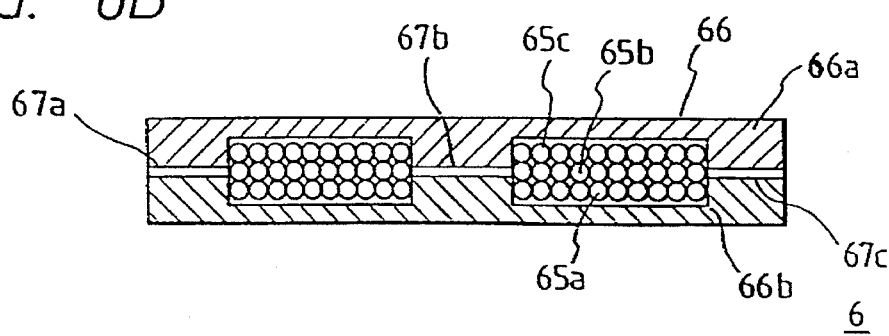
FIG. 6B is a cross-sectional view of the thin transformer of FIG. 6, taken along line VIB—VIB.

FIG. 6A is a plan view showing the construction of a second embodiment of a power supply apparatus using a two-output DC-DC convertor according to the present invention; and FIG. 6B is a cross-sectional view of the embodiment of FIG. 6A, taken along the line VIB—VIB.

In FIG. 6A and FIG. 6B, a transformer 6 comprises EE shape iron core halves 66a, 66b which together form a thin flat elongate iron core 66 made of ferrite material, with non-magnetic sheets 67a, 67b and 67c provided between the iron cores 66a and 66b. Other elements shown in FIG. 6A and FIG. 6B indicated by the same reference numbers as those shown in FIG. 2 and FIG. 3, are the same. At least part of the plural coils constituting the transformer 6 is covered by the iron cores 66 (66a, 66b) made from the ferromagnetic body.

In the transformer 6 shown in FIG. 6A and FIG. 6B, the first secondary coil 65a, the primary coil 65b and the second secondary coil 65c are laminated in a conventional manner using an adhesive, similarly to those of the above-stated wire-type transformer, and are sandwiched between the iron cores 66a and 66b. By providing thin sheets of non-magnetic film 67a, 67b and 67c in the transformer 6, the excitation inductance is adjusted to be about 10–25 μH. The connection of the above three coils 65a, 65b and 65c is the same as that shown in FIG. 4.

The difference between the second embodiment and the first embodiment according to the present invention is that in the first embodiment the wire-type transformer shown in FIG. 2 and FIG. 3 is employed, however, in the second embodiment the transformer having the iron cores 66a and 66b shown in FIG. 6A and FIG. 6B is employed. The circuit construction shown in FIG. 1 may be used without modification in the second embodiment.

In the second embodiment according to the present invention, the thin iron cores 66a and 66b increase the flux linkage between the first secondary coil 65a, the primary coil 65b and the secondary coil 65c. Accordingly, the length of the coil can be shortened in comparison to that of the wire-type transformer shown in FIG. 2 and FIG. 3, so that it is possible to further reduce the copper loss.

In general in the transformer having the iron core, the magnitude of the excitation inductance is larger than that of the wire-type transformer. For example, the magnitude of the excitation inductance of the wire-type transformer in the first embodiment is about 5 μH, however, the magnitude of the excitation inductance of the transformer having the iron cores in the second embodiment is about 10–25 μH.

Further, since the second output voltage is inversely proportional to the magnitude of the excitation inductance, the same output voltage can be obtained in the second embodiment as in the first embodiment, at a lower frequency.

The transformer having the above-stated iron core construction has a width of about 10 mm, a depth including the terminal portion of about 12 mm, a height of about 4 mm and a weight of about 10–12 g. Thus, a compact size and the light weight transformer can be obtained.

As stated in above, according to the embodiment of the present invention, in the power supply apparatus, utilizing the excitation energy accumulated in a thin transformer such as the wire-type transformer, in addition to the output voltage obtained commonly from the secondary side of the thin transformer, the output voltage can be obtained through a simple circuit construction connected to the secondary side of the transformer.

Accordingly, in the power supply apparatus, using the thin transformer such as the wire-type transformer having only a pair of the primary coil and the secondary coil, the direct current output voltage having two outputs can be obtained. Thereby, it is possible to reduce substantially the volume and the weight of the transformer. As a result, the present invention can be used for a smaller in size, the thinner construction and lighter weight information machine with the DC-DC convertor.

Further, since it is possible to make the winding ratio of the transformer smaller, the copper loss in the transformer can be reduced. As a result, in a case in which the personal computer and the word processor etc. are mounted in a hand held type information machine, the electric power consumption in these machines can be reduced and the use time can be increased.

Further, in a case of the smaller construction in size of the power supply apparatus, it is unnecessary to select in particular the higher switching frequency for the switching element, and at the same time the cost for manufacturing the power supply apparatus can be reduced.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A power supply apparatus comprising:

a transformer having a primary coil and a secondary coil;

at least one switching element connected in series with said primary coil of said transformer for controlling a flow of current therein between an "on" cycle in which current flows, and an "off" cycle in which said current is interrupted;

a first rectifying and smoothing circuit connected to said secondary coil of said transformer; and a second rectifying and smoothing circuit connected to said secondary coil of said transformer;

said first rectifying and smoothing circuit having a first current control element which is activated to permit a current to flow in said first rectifying and smoothing circuit during said "on" cycle, and first output terminals for providing a first output voltage as a function of said current flowing in said first rectifying and smoothing circuit; and said second rectifying and smoothing circuit having being a second current control element which is activated to permit a current to flow in said second rectifying and smoothing element during said "off" cycle, and second output terminals for providing a second output voltage as a function of said current flowing in said second rectifying and smoothing circuit.

2. A power supply apparatus according to claim 1 wherein each of said primary and secondary coils of said transformer comprises a spiral winding of an insulated conductor, said first and second coils being arranged in parallel and adjacent to each other.

3. A power supply apparatus according to claim 2 wherein said conductors are covered by a sheet which includes a magnetic powder material.

4. A power supply apparatus according to claim 1 further comprising a D.C. voltage supply connected to said primary coil of said transformer, wherein:

said second output voltage has a negative value relative to said D.C. voltage supply.

5. A power supply apparatus according to claim 1 wherein said second output comprises a power supply for driving a liquid crystal display apparatus.

6. A power supply apparatus according to claim 1 wherein an absolute value of a voltage generated in a primary side of said transformer during said "off" cycle of said switching element is greater than a voltage applied to said primary side of said transformer during said "on" cycle of said switching element.

7. A power supply apparatus according to claim 1, wherein:

during said "on" cycle of said at least one switching element, an excitation current is accumulated in said primary coil of said transformer; and during said "off" cycle of said at least one switching element, said accumulated excitation energy is used as said second output voltage through said secondary coil of said transformer.

8. A power supply apparatus comprising:

a transformer having a primary coil and a secondary coil;

at least one switching element connected in series with said primary coil of said transformer;

a first diode having an anode connected to a first terminal of said secondary coil of said transformer;

a secondary diode having a cathode connected to said first terminal of said secondary coil of said transformer;

an electrical charge accumulating element connected between an anode of said second diode and a second terminal of said secondary coil of said transformer;

a first output coupled to said first diode, for providing a first output voltage as a function of a current flow in said first diode during an "on" cycle of said switching element; and a second output coupled to said electrical charge accumulating element for providing a second output voltage as a function of electric current flow from said secondary coil through said electrical charge accumulating element and said second diode during an "off" cycle of said switching element, said second output voltage having a value different from that of said first output voltage.

9. A power supply apparatus comprising:

a transformer having a primary coil and a secondary coil;

at least one switching element connected in series with said primary coil of said transformer for controlling a flow of current therein between an "on" cycle in which current flows, and an "off" cycle in which said current is interrupted;

a first diode having an anode connected to a first terminal of said secondary coil of said transformer;

a second diode having a cathode connected to said first terminal of said secondary coil of said transformer;

an electrical charge accumulating element connected between an anode of said second diode and a second terminal of said secondary coil of said transformer;

a first output coupled to said first diode, for providing a first output voltage as a function of a current flow in said first diode during an "on" cycle of said switching element, whereby an excitation energy is accumulated in said primary coil of said transformer during said "on" cycle of said at least one switching element; and a second output coupled to said electrical charge accumulating element, for providing a second output voltage as a function of electrical current flow from second secondary coil through said electrical charge accumulating element and said second diode during an "off" cycle of said switching element, said second output voltage having a value different from that of said first output voltage;

whereby said accumulated excitation energy is used as said second output voltage through said secondary coil of said transformer during said "off" cycle of said at least one switching element.

* * * * *